United States Patent [19]

Gallizia et al.

[11] 4,199,315

[45] Apr. 22, 1980

[54] APPARATUS FOR THE INJECTION MOLDING OF PNEUMATIC TIRES HAVING SYMMETRICAL PARTS OF SIMILAR PHYSICAL CHARACTERISTICS

[75] Inventors: Achille Gallizia; Paolo Bandel, both of Milan, Italy

[73] Assignee: Industrie Pirelli S.p.A., Milan, Italy

[21] Appl. No.: 921,069

[22] Filed: Jun. 30, 1978

Related U.S. Application Data

[62] Division of Ser. No. 766,038, Feb. 7, 1977, Pat. No. 4,123,496.

[30] Foreign Application Priority Data

Feb. 19, 1976 [IT] Italy .............................. 20307 A/76

[51] Int. Cl.² .......................... B29F 1/04; B29H 3/08
[52] U.S. Cl. .................................. 425/572; 249/107; 249/110; 425/573
[58] Field of Search ................. 264/36, 260, 279, 315, 264/326, 328, 329; 156/125; 425/120, 123, 572, 573, 543, 544; 249/107, 110

[56] References Cited

U.S. PATENT DOCUMENTS

| | | | |
|---|---|---|---|
| 2,191,703 | 2/1940 | Anderson | 264/328 X |
| 2,476,884 | 7/1949 | Maynard | 264/326 X |
| 2,569,935 | 10/1951 | Leguillon et al. | 264/328 X |
| 3,389,749 | 6/1968 | Towns et al. | 264/328 X |
| 3,891,740 | 6/1975 | Vannan | 264/326 X |
| 3,968,307 | 7/1976 | Matsui et al. | 264/171 X |
| 4,088,523 | 5/1978 | Gallizia et al. | 264/326 X |

FOREIGN PATENT DOCUMENTS

| | | | |
|---|---|---|---|
| 1118445 | 11/1961 | Fed. Rep. of Germany | 264/36 |
| 2338458 | 2/1975 | Fed. Rep. of Germany | 425/572 |
| 4746458 | 11/1972 | Japan | 264/329 |

*Primary Examiner*—Jan H. Silbaugh
*Attorney, Agent, or Firm*—Stevens, Davis, Miller & Mosher

[57] ABSTRACT

An apparatus is provided for injection molding a pneumatic tire having corresponding symmetrical parts such as the sidewalls of the tire which are geometrically symmetrical and have substantially the same physical characteristics. The apparatus involves means for providing a feed stream of suitable plastic or elastomeric compound such as rubber, separating the feed stream into intermediate streams and remixing the intermediate stream before injection into the mold. The compound is injected into the mold cavities at uniformly spaced points along at least one of the annular zones of the cavity. The feed stream is preferably separated into two streams, one of which comes primarily from the outer portion of the stream and the other predominantly from near the center of the stream and then these streams are intermixed to provide a stream which is substantially uniform in composition throughout. Similarly prepared streams are injected into the two parts of the mold cavity which form a pair of symmetrical parts of the tire such as the two sidewalls.

15 Claims, 10 Drawing Figures

APPARATUS FOR THE INJECTION MOLDING OF PNEUMATIC TIRES HAVING SYMMETRICAL PARTS OF SIMILAR PHYSICAL CHARACTERISTICS

This is a Division of application Ser. No. 766,038 filed Feb. 7, 1977, now U.S. Pat. No. 4,123,496.

This invention relates to an apparatus and a process using the apparatus for the injection molding of pneumatic tires.

The invention is particularly applicable to pneumatic tires for motor vehicles in which different compositions are used for making different parts of the tire, i.e., tires in which the crown is made of one composition and the sidewalls are made from a different composition. The invention is particularly important for the molding of the sidewalls of a tire. Hence, it will be described herein with reference to such molding, but it may be used generally for the molding of any tire portions which are mirror images of one another relative to the median plane of the tire, i.e., to the tire plane of symmetry perpendicular to the wheel axis.

There must be perfect physical symmetry (isotropy) between the portions which are geometrically symmetrical in a pneumatic tire. In other words, it is not sufficient that the mold cavity, and hence the mass of injected material, possesses the required geometrical symmetries, in particular, when it comprises two portions which are mirror images of one another relative to the median plane of the tire. It is also necessary that the physical properties of the geometrical symmetrical parts be substantially the same as regards internal stresses, deformations, degree of vulcanization, mechanical properties of the material and the like. Otherwise, the molded body will not have the desired symmetry when it is demolded, when it is inflated or when it is subjected to stresses. Therefore, in the following description of the present invention a distinction will be made between the geometrical symmetry and the physical symmetry, it being obvious that the lack of symmetry of physical properties may and generally does give rise, at one time or another, during the life of the tire, to a lack of geometrical symmetry, even if such symmetry did exist initially.

Injection molding of tires, especially of tires having parts made from different compositions is a substantially new process in the art. Although proposals for the injection molding of pneumatic tires have already been described in the technical literature, these proposals do not deal with and do not resolve the problem of the physical symmetry of the tire and do not produce a tire having such symmetry. In any case, these proposals generally relate to the injection molding of tires made of only one composition and which, moreover, do not usually contain natural or synthetic rubber. On the other hand, the injected molded tire is made from plastic materials which have substantially different physical properties from those of natural or synthetic rubber.

A process is described in French Pat. No. 1,508,135 which, in general and in theory, may be utilized for the molding of tires from two different compositions. In accordance with the disclosed process, the sidewalls are molded first and then, after having substituted the necessary mold part, the tread is molded. However, the tire produced by such a process from two different compositions would not be entirely satisfactory because its properties would be substantially uneven. The faults would be particularly significant if the sidewalls were molded from natural rubber compounds. This is especially true if the tire has the configuration of the tire described in Italian Pat. No. 928.502 U.S. Pat. No. 3,805,868 granted Apr. 23, 1974.

The invention will now be described with particular reference to tires of the type described in U.S. Pat. No. 3,805,868 but it is to be understood that it is adaptable for other types of motor vehicle tires. A tire of the type described has two sidewalls extending away from one another from the respective beads to the respective zones of connection to the crown. The sidewalls are substantially convex inwardly when in a deflated condition and are still convex, though less markedly, when in an inflated condition. The crown is outwardly convex and acts as a tread in the central portion thereof where it normally comes into contact with the ground. The crown is reinforced by means of a suitable annular, substantially inextensible reinforcement member which is generally made of a textile material. In U.S. patent application Ser. No. 596,409 filed July 16, 1975, now U.S. Pat. No. 4,088,523, a single stage process has been described which is suitable for the molding of a tire of this type.

Although the present description is made with reference to a two-stage process, i.e., a process in which the sidewalls and the crown are molded in two different stages, the present invention may be applied also to a single process of the type described in the earlier application Ser. No. 596,409.

Thus, the main object of the present invention is to provide a process and apparatus for making a pneumatic tire by injection molding in which every part, especially the sidewalls, has an excellent symmetry, both geometrically and physically. A more specific object of the invention is to provide a method for making a tire by injection molding which produces sidewalls made of a rubber compound, particularly a natural rubber compound, which are both physically and geometrically symmetrical.

Other objects and particular advantages of the invention will become apparent from the following description with reference to the accompanying drawing wherein FIG. 1 is a diagrammatical plan view of an apparatus according to one embodiment of the invention;

Figure 1:
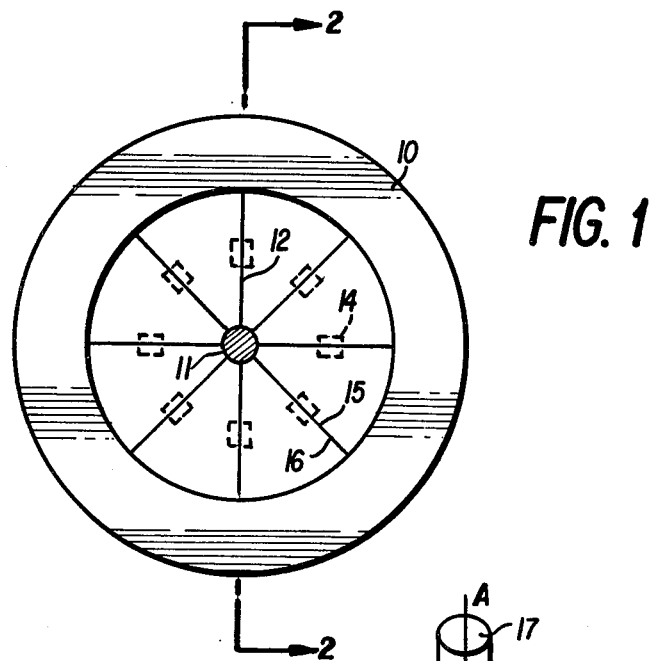

Hereinafter, the expression "symmetrical parts" of the tire will be used to indicate any two portions of the tire which have to be mirror images of one another relative to the "median plane" of the tire (therewith being meant the plane which, when the tire is mounted, coincides with the plane of symmetry of the rim perpendicular to the axis of the wheel); and each of those portions, taken separately, will be referred to as a "symmetriacl portion". Such symmetrical parts may be well defined components of the tire, such as, for example, the sidewalls (the word "sidewall", as used herein, is intended to include the bead) or parts of the sidewalls, well defined parts, such as the beads or any portion thereof, such as, for instance, portions made of a material different from that of the other portions of the sidewalls. The symmetrical parts may be also the two halves of the crown which are arranged on opposite sides of the median plane, or portions of the crown which are symmetrical relative to the plane and are made of a material different from that of the other portions.

The process provided by the present invention is characterized in that a primary fluid supply of compound is generated, that the mold cavities which correspond to symmetrical parts are filled from that supply with fluid molding compound by means of a plurality of injection streams which penetrate into each one of the parts through openings which are uniformly spaced on at least one annular zone, and that the injected streams are formed partly by an "outer" compound and partly by an "inner" compound of the supply stream in practically equal proportions for all of the injection streams.

In order to render more clearly the present description and the annexed claims it is convenient at this point to explain the meaning of some of the terms used and which will be used herein.

The molding fluid compound is obtained, by means known in the art and which do not need to be described herein, through kneading, mastication, fluidification, pressurizing operations, which are well known per se. In this way, a feeding flow or supply stream of fluid compound to be injected is produced, which flow is fed to the mold through one pipe or conduit whose axis generally coicides, at least at the end portion, with the axis of symmetry of the mold. It is also possible to utilize two or more feeding pipes or conduits: for example, two pipes whose axes coincide, in the end portion, with the axis of symmetry of the mold and which are arranged in opposed relationship on the same axis at the two sides of the mold. In these cases, all the material flowing through the two or more feeding pipes will be considered totally as a single stream included in the expression "feed stream".

The mold cavities corresponding to any pair of the symmetrical parts, even if the mold constitutes a mechanical unit, are considered as distinct, inasmuch as compound does not pass from one to the other.

According to the invention, when the symmetrical parts are the sidewalls, the compound is introduced separately into the mold cavities of each sidewall, preferably from the region of the bead, so as to render the injection itself perfectly symmetrical with respect to the axis of the mold and as uniform as possible, minimizing the necessity of having the injected streams spread out in a fan-shaped fashion from the zone of the bead to the zone of connection of the sidewall to the crown which has a greater diameter. In each sidewall cavity, each injection opening is ideally annular, but practically it is not convenient to provide one or more true annular openings, and one contents himself with providing at least one plurality of sufficiently and uniformly spaced openings, each of which forms a segment of the annular opening or of one of them, so that everything takes place as though the injection were made into one or more annular openings, portions of which, uniformly spaced, had been closed. Thus, a plurality of real injection openings located along at least one annular zone is obtained for each sidewall and at each of these openings there is an injected stream which enters the mold through the opening itself.

Analogous consideration may be made in respect of symmetrical parts other than sidewalls. If such parts are the beads, the injection openings will remain in the position as said before; if they are different portions of the sidewalls, they will be correspondingly displaced. If the symmetrical parts are the two halves of the crown, it is preferable to inject the compound from two series of openings disposed on two annular zones located at the two shoulders of the crown, from which the streams of compound will converge to meet each other on the median plane. An analogous arrangement will be used for injecting symmetrical portions of the crown which do not form the whole crown, by arranging the injection openings in a different position depending on the circumstances.

The most simple way of carrying out the injection molding would be that of dividing the supply stream of compound into the various injection streams relative to one or the other of each pair of symmetrical parts, taking care that the cross-sections of the paths are uniform so that each stream has the same volume which is indispensable for the regularity of the injection.

However, unexpectedly, by acting in this way one does not obtain a tire having a perfect physical symmetry.

Not even the perfect symmetry of the molding apparatus with respect to the median plane of the tire insures the physical symmetry of the latter. It would seem that, if the apparatus is symmetrical, any local characteristic of a part should be reproduced at the symmetrical point of the corresponding part and that in this way the physical symmetry of the geometrically symmetrical parts should be achieved. But experience teaches that it is not so. The molding process of a pneumatic tire is so delicate that even in case of having avoided the dissymmetries which may be called systematic dissymmetries, i.e., due to the geometry of the apparatus and therefore visually identifiable and even the rheological dissymmetries, which are very difficult to eliminate completely, consisting in harmful delivery differences, the desired result is not achieved with certainty, obviously because of accidental, casual and eventually variable dissymmetries which cannot be determined quantitatively and corrected, neither can they be generically identified in a reliable way. The present invention, instead, allows one to obtain an excellent physical symmetry of the tire in spite of the presence of these non-identifiable factors; and as will be seen, when carrying out the process according to the present invention it is not even necessary to have a strict geometrical symmetry of the apparatus. It is possible, for example, to feed the compound to the zone of the mold at only one side of the same, which is very advantageous both from the structural and the operational point of view.

The applicants have found, as a result of careful studies and experiments, that it is not sufficient to simply divide the feed supply of compound into many injection streams of the same volume, but it is also necessary to carry out a further operation which may be referred to as "equalization". In this way, each injected stream contains a part of the outer zone or strata of the stream of compound and a part of the inner zone or strata of the feed supply of compound, in proportions, which are practically equal for all of the secondary streams.

In any liquid vein flowing in a pipe or conduit there is an outer zone, i.e., a zone situated near the walls of the pipe or conduit and an axial or inner zone, i.e., a zone which is situated around the axis of the pipe or conduit. Obviously, the distinction between the two zones is not a sharp distinction, because between the clearly inner strata and the clearly outer strata there are intermediate strata. Thus, expressions such as "outer compound" and "inner compound", in this case, are to be considered as being approximate. That is, they are intended to indicate, respectively, the parts of the stream compound which are situated nearer to the walls of the conduit and the parts which are situated nearer to the central axis, and the separation between the two parts is arbitrary and need not be defined for the comprehension and accomplishment of the present invention. When the feed supply of compound is distributed in a plurality of pipes or conduits, as "outer compound" and "inner compound" are considered, respectively, the complex of the outer compounds and that of the inner compounds of the various pipes or conduits.

It is believed that the surprising technical effect of the present invention, thanks to which it has been possible to obtain pneumatic tires having a perfect physical symmetry, which are not obtainable by prior art techniques, may be explained by the following considerations, which, however, are given by way of suggestion and illustration and not for any binding effect and which are in no way determinant for the definition and accomplishment of the invention.

In a stream of material having the rheological properties of a compound used for injection molding and in particular, in the compounds which are especially of interest herein, containing natural rubber, the behavior of the speed in a cross-section has not the usual parabolic diagram which is associated, for example, with the viscous flow of water or similar liquids. The linear speed increases rather suddenly with departure from the walls and reaches fairly soon a value which is then maintained practically constant throughout the axial zone of the fluid vein. Correspondingly, very substantial slidings take place between adjacent strata in the outer zone and practically no sliding in the axial zone. The deformation work corresponding to such slidings produces a very considerable and unavoidable temperature difference between the outer and the axial zones of the stream. It can be said that the temperature is higher where the derivative of the speed of the flow of compound in a radial direction is higher and the value of said derivative reflects the "outer" or "axial" character of each particle of the flowing compound. When a feed stream is divided into a plurality of injection streams, some of which are intended to fill the cavity of a part, while the other injection streams are intended to fill the cavity of the part which is symmetrical to the former, obvious geometrical reasons cause the material coming from the outer zone of the feed stream to be predominantly present in some injection streams, particularly in those relative to one part, while the material coming from the axial zone is predominantly present in other injection streams, particularly in those relative to the other part. Applicants believe that this uneven distribution of the material of the outer and the axial compound in the feed stream may chiefly be ascribed to the physical assymmetry which is found especially between the sidewalls and/or between different zones of each sidewall when the injection is carried out according to the known technique, even if all the precautions suggested by the technique or which may be provided by a person skilled in the art are taken to insure the absolute uniformity of the streams.

It is to be noted, however, that physical dissymmetries may arise even in those conditions in which the geometry of the apparatus would indicate that globally the quantities of the axial and outer compounds fed to two symmetrical parts should be equal. It can be supposed that even in these cases there is an interference of accidental temperature variations or eventually other non-identifiable causes which determine a physical asymmetry and which are compensated by the equalization of each injection stream.

Although, as said before, it is necessary that the portions of outer compound and axial compound of the feed stream be present in substantially constant proportions in the injection streams intended to give rise to symmetrical parts, it is obviously not possible to make sure that the proportions of axial and outer compounds be exactly the same, nor is it necessary to ascertain such condition, because when the desired physical symmetry has been achieved, it is obvious that any variation of the proportions which remains becomes negligible. This is what is meant by the expression "proportions practically equal for all of the injection streams" of the outer and inner compounds.

According to one characteristic of the invention, the equalization of the composition of the injection streams is achieved by forming from the feed stream a plurality of intermediate streams and by combining again these intermediate streams in such a way as to obtain from them, in the end, sufficiently uniform injection streams.

According to a preferred characteristic of the invention, some of the intermediate streams are predominantly outer ones and some are predominantly axial ones, and they are combined again in such a way that each injection stream has a quantity of predominantly outer stream substantially equal to the quantity of the predominantly axial stream.

The expressions "predominantly outer stream" and "predominantly axial stream", as used hereinbelow and in the annexed claims relate exclusively, unless specifically stated otherwise, identify the outer and the axial or inner portion of the feed stream. That is, "predominantly outer" is any stream which contains predominantly or only a material coming from the outer zone of the feed stream, and "predominantly axial" is any stream which contains predominantly or only a material coming from the axial zone of the feed stream. Since it is not possible to obtain absolutely axial or outer streams, the word "predominantly" is always implied even where simply axial or outer streams are mentioned.

Further preferred and more particular embodiments of the invention are characterized by the presence of one of the following characteristics or of more than one of them in combination:

(a) both the predominantly outer streams and the predominantly axial streams are in number equal to the number of the injection streams for each symmetrical part of the tire;

(b) each predominantly outer stream is combined with a predominantly axial stream to form a combined stream, to form an injection stream for one symmetrical part of the tire and an injection stream for the other corresponding symmetrical part;

(c) the feed stream is subdivided into pairs of predominantly axial and outer intermediate streams; or it is subdivided into a plurality of streams which will be called "secondary streams" to distinguish them from the stream from which derive and which will then be referred to as "primary stream", said secondary feed streams containing outer and axial compounds in the same proportions as the primary flow, but with a different spatial distribution apt to facilitate the separation into predominantly outer and predominantly axial intermediate streams;

(d) the secondary feed streams and/or the predominantly outer and the predominantly axial streams and/or the combined intermediate streams and/or the inection streams have a rectangular cross-section;

(e) each pair of predominantly axial and predominantly outer streams is inverted before the streams are joined to one another to form a combined stream, it being thereby meant that the streams exchange their position, for example, relative to the plane of mirror image symmetry of the tire, so as to bring the innermost strata of the ones to be adjacent to the outermost strata of the others;

(f) the axis of the mold is vertical, i.e., the tire is molded in a horizontal position, and the secondary feed streams and the intermediate streams run in a substantially radial direction with respect to the mold;

(g) the predominantly outer and predominantly axial streams which are directed radially as said before, are diverted in such a way that the predominantly axial streams will occupy the plane which previously was occupied by the predominantly outer streams and vice versa and the streams are then joined, so that from a predominantly outer and a predominantly axial stream a combined stream is generated which runs in a substantially radial direction relative to the mold, from each of the combined streams there being derived (upwards and downwards if the axis of the mold is vertical) two injection streams for two symmetrical parts.

It is also an object of the present invention to provide a molding apparatus for pneumatic tires which is suitable for carrying out the process provided by the invention and which comprises, in combination with a mold having cavities capable of producing symmetrical parts of the tire having the desired geometrical characteristics, at least one conduit for feeding the fluid molding compound, a plurality of injection conduits for introducing the compound into the two cavities of the mold, the conduits associated with each mold cavity leading into it through openings which are uniformly spaced on at least one annular zone, means for drawing intermediate streams from the feed conduit, and means for combining again the intermediate streams and for feeding to the injection conduits sufficiently uniform streams of mixture.

According to a preferred characteristic of the invention, the means for drawing intermediate streams comprises means for drawing predominantly axial streams and predominantly outer streams.

According to another preferred characteristic of the invention, the means for combining again the intermediate streams comprises means for imparting to the mixture to be fed to the injection conduits a sufficient uniformity of temperature.

According to another preferred characteristic of the invention, the means for combining again the intermediate streams are such as to give rise to substantially equal deliveries of predominantly axial and predominantly outer streams.

According to a further preferred characteristic of the invention, the means for combining the intermediate streams comprises means for bringing the innermost strata, i.e., those which were situated in the inner portion of the feeding conduit, to be adjacent to the outermost strata, i.e., to those which were situated in the outer portion in the feed conduit.

In a further preferred embodiment of the invention, the symmetrical parts are the sidewalls of the tire and the annular zones are situated at the beads.

In another preferred embodiment of the invention, the means for originating the outer stream of material and the axial stream of material from the feeding conduit to the injection conduits comprises first offtake conduits located so as to receive the predominantly outer streams of compound and second offtake conduits located so as to receive predominantly axial compound streams, said offtake conduits joining each other in such a way as to form from at least one offtake conduit of outer compound and at least one offtake conduit of axial compound a combined conduit, the combined conduit feeding at least one injection conduit.

In other particularly preferred embodiments of the invention, the apparatus possesses one of the following characteristics or more than one of them in combination:

(a) both the first and the second offtake conduits are in number equal to the number of the injection conduits for each symmetrical part of the tire;

(b) each first offtake conduit is connected to a second combined conduit from which there are formed in injection conduit for one symmetrical part of the tire and an injection conduit for the respective second symmetrical portion;

(c) from the feeding conduit, or from each feeding conduit, there are directly derived the offtake conduits, those which receive predominantly outer compound being derived upstream of the others with respect to the direction of the feed stream; or from each primary feed conduit there are derived a plurality of conduits which will be referred to as "secondary conduits" to distinguish them from the other conduits, which will then be referred to as "primary conduits", the secondary conduits being distributed symmetrically relajtive to the respective primary conduit, and each of them being divided into at least one first and one second offtake conduit;

(d) the secondary feeding conduits and/or the offtake conduits and/or the combined conduits and/or the injection conduits have a rectangular cross-section;

(e) each pair of first and second offtake conduits is inverted before the members of the pair are joined together to form a combined conduit; by this is meant that they are exchanged in their position, for example, with respect to the plane of mirror image symmetry of the tire, so as to bring the more intermediate strata of the compound flowing through one of them to be adjacent to the outermost strata of the compound which flows through the other;

(f) the axis of the mold is vertical, i.e., the tire is molded in a horizontal position, the primary feeding conduit or conduits extend, at least at the end portion, along said axis, and the secondary feeding conduits, the first and the second offtake conduits and the combined conduits extend in a substantially radial direction with respect to the mold and symmetrically with respect of the axis of the latter;

(g) the first and second offtake conduits which extend radially as said before, are diverted in such a way that the second conduits will be located in the plane in which previously were located the first conduits, and vice versa, and said conduits are then joined together, so that from one pair of them a combined conduit is obtained which extends in a substantially radial direction with respect to the mold, from each of said combined conduits there being derived (upwardly and downwardly if the axis of the mold is vertical) two injection conduits for the two cavities of the mold.

The molding operation, although being more easily carried out with the axis of the mold in a vertical position, may also be carried out with the axis of the mold in a horizontal position, inasmuch as the perturbation effects of the gravity are not notable in an operation of this kind. Hence, should the axis of the mold be disposed horizontally, nothing essential would have to be changed in the examples which will be described hereinbelow, and therefore these examples apply to this case as well.

Figure 2:
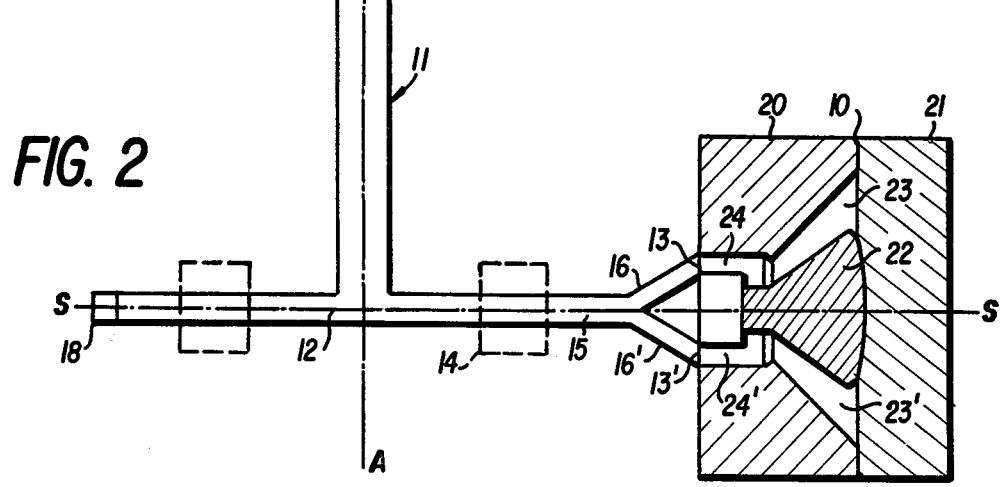
FIG. 2 is an enlarged, partial cross-sectional view taken along line 2—2 of FIG. 1 with parts shown in elevational view.

Referring now to FIGS. 1 and 2, one embodiment of the invention in which the symmetrical parts to be molded are the sidewalls of the tire is illustrated. The mold for molding the sidewalls is indicated generally by reference numeral 10. Reference numerals 23-23' indicate the two cavities of the mold. It has to be noted that throughout the present description and in the claims, when the word "cavity" is used, reference is made to the cavities which define the configuration of the symmetrical parts under consideration, for the molding of which the present invention is applied. Other cavities which may be present in the mold, and for example, the cavity relating to the crown (when the invention is not applied also to the molding of the crown) are not taken into consideration and are not included in the expression "cavity of the mold".

In the description of this embodiment, it is proposed to mold first the sidewalls and then to substitute those parts of the mold which are required for molding the tread for the ones used in molding the sidewalls. This, however, as said before, does not represent a limitation of the invention, since it is possible, without departing from the scope of the invention, to mold the various parts of the tire not only in the way described herein, but also by a single operation, or by successive operations, but without any substitution of parts of the mold. On the contrary, the embodiment of the invention which will be described first is particularly suitable to be used for the simultaneous molding of all of the parts of the tire, with suitable modifications of the mold, as will be better explained later with reference to FIG. 7.

The primary feed conduit, through which flows the primary feed stream, is indicated by reference numeral 11. Conduit 11 is disposed on one side only of the plane S—S of mirror image symmetry of the sidewalls, which is indicated in FIG. 2.

Figure 4:
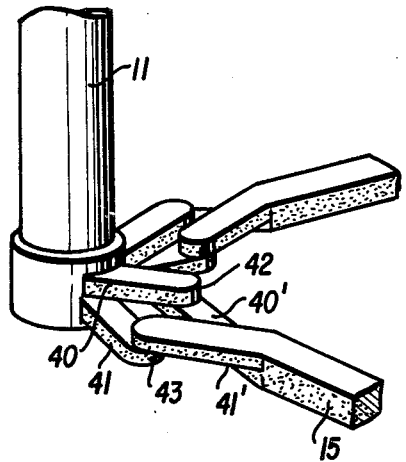

The primary feed conduit 11 is subdivided into a number of secondary conduits 12, which are only diagrammatically shown in FIG. 1 and which are arranged symmetrically relative to the axis of the mold, which axis is also the axis of the primary feed conduit 11 and is indicated by reference letters A—A (FIG. 2) in the example shown. The secondary conduits 12 may be very short or even completely omitted, as shown in FIG. 4. In this embodiment, eight injection conduits are used. Eight injection points are shown diagrammatically at 13 or 13' in the upper and lower sidewall respectively. It has to be pointed out that this embodiment is described while assuming that the mold is horizontal and the axis A—A is vertical, but, as said in the introduction to the present description, no substantial change would be required if the position of the whole assembly were rotated by any angle, even by an angle of 90°, in which case FIG. 1 would represent a vertical side elevational view and the plane of FIG. 2 would become a vertical plane.

It has to be pointed out as well that in this embodiment, the axes of the secondary conduits 12 lie in the plane S—S and, as will be seen later, the equalization device 14 is approximately symmetrical relative to said plane. It would, however, be possible, although not desirable, to displace the parts perpendicularly to plane S—S at one side or at the other, and in other cases the conduits and the equalization device 14 may be inclined with respect to the plane S—S, as in the case shown in FIG. 7, or be suitably diverted.

As already said before, the assembly of the injection points at which the mold is provided with inlet openings, substitutes the ideal annular slot along which the injection should be carried out, and the number of the chosen point depends upon the circumstances and is so established as to obtain the desired injection uniformity all along the circular development of the sidewalls.

Each secondary conduit 12 terminates with an equalization device 14 which will be better described later and whose position is only diagrammatically indicated by rectangles shown in dashed lines in FIG. 1 and in FIG. 2. In the equalization device 14 the secondary feed conduits 12 are each divided into a first and a second offtake conduit, in which a predominantly outer and a predominantly axial compound flow, respectively, and which will be better illustrated later. At the end of the equalization device 14 each pair of offtake conduits join together to form a combined conduit 15 which, in turn, is divided into injection conduits 16 and 16' for the two sidewalls, in the present case the upper sidewall and the lower sidewall (the passage from the first mentioned conduit to the second conduits not being visible in FIG. 1).

In the embodiment shown, the primary feeding conduit 11 has a circular cross-section, as shown at 17, and the secondary feed conduits 12, as well as all the successive conduits, have a rectangular cross-section (said expression including also the case of a square cross-section), as shown diagrammatically at 18. If desired, also other cross-sections may be used.

In FIG. 2 there is diagrammatically shown in a cross-sectional view one-half of the mold, the other half, which is perfectly symmetrical, being omitted. On the other hand, the structure of the mold does not form part of the invention, the structure depending, instead, on the structure of the particular tire, and a diagrammatical example of it is given herein for the sake of clarity only. In this example, the mold 10 is subdivided into two halves 20 and 21 and comprises a core 22. This latter, together with the half 20, defines the cavities 23-23', into which the compound will be injected. The half 21 will be substituted later, for molding the crown. The compound is introduced into the cavities 23-23′ from the injection points 13-13′ through the injection conduits 24-24′.

Figure 3:
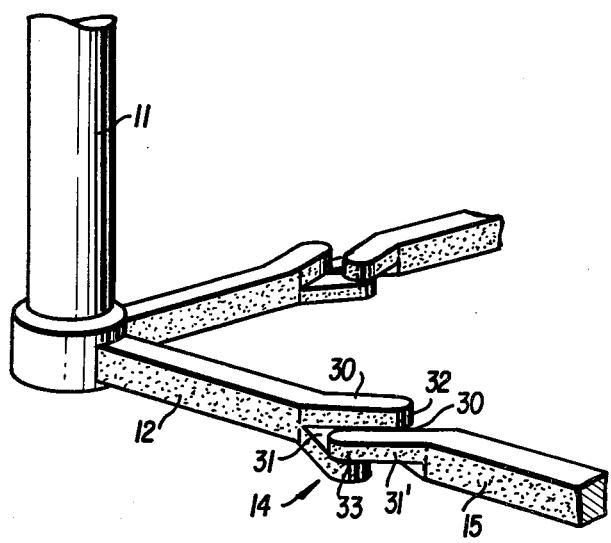
FIGS. 3 and 4 are perspective views of a detail (equalization device) according to two embodiments of the invention.

An embodiment of the equalization device 14 is shown in a perspective view in FIG. 3. Each secondary feed conduit 12 is subdivided into a first and a second offtake conduit, indicated by reference numerals 30 and 31 respectively, in the first of which flows the outer compound, while in the second flows the axial compound, the first being disposed, in the vertical axis molding arrangement which is being illustrated, above the second. First conduit 30 is bent downwards, and the second conduit 31 is bent upwards, as shown at 32 and 33, respectively, and these conduits exchange their respective positions, so that the second results now in being situated above the first (the two conduits being indicated in the drawing, in this new position, by reference numerals 30′ and 31′, respectively) and finally join together to form a combined conduit 15.

FIG. 4 shows a second embodiment of the equalization device. In this embodiment, secondary conduits 12, which, as already said previously, may have any desired length, are completely missing. Directly branched from the feed conduit 11 are the first and the second offtake conduits for the outer and the axial compounds, respectively, which offtake conduits are indicated in the Figure by reference numerals 40 and 41, respectively. They are bent downwards and upwards, respectively (looking at the device as it is shown in the figure), as indicated at 42 and 43, and their position is exchanged by, so to say, inverting the flows, and in the position achieved after the inversion, they are indicated by reference numerals 40′ and 41′. The inverted conduits 40′ and 41′ are then joined together to form the combined conduits 15. It can be seen that the outer compound conduits are branched from the feed conduit upstream of those for the axial compound relative to the flow direction of the compound towards the mold, which direction is from the top to the bottom in the figure.

Figure 5:
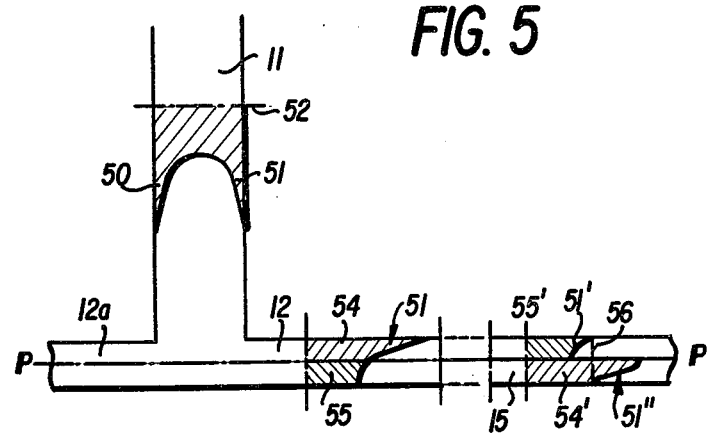
FIG. 5 is a diagrammatical representation of rheological phenomena which occur during the accomplishment of the invention.

It is clear, and it will be better understood with reference to FIG. 5, that in FIGS. 3 and 4 the outermost strata (i.e., those situated in the uppermost part of the figures) of the outer compound conduits 30 and 40, are situated, after the reversal, adjacent the innermost strata (i.e., those situated in the lowermost part of the figure) of the axial compound conduits 31 and 41.

It is not necessary that the cross-section of the primary feed conduit be round, and if it were not, the geometry of the secondary conduits and/or the offtake conduits, as well as their number, could be suitably varied to adapt them to the different cross-section of the feed conduit.

Also not necessary is that the other conduits have a rectangular cross-section, and also in such a case the geometry of the various parts may be arranged to suit the change of the cross-section, without any difficulty. The number of the conduits may also vary in any case. Nor is it necessary that the offtake conduits be arranged two by two, and thus, for instance, in the embodiment shown in FIG. 3, from each secondary conduit 12 there may be derived more than one outer compound conduit and more than one axial compound conduit.

Also, the course of the conduits may be varied within ample limits. Thus, in FIGS. 3 and 4, there have been shown offtake conduits which extend in planes parallel to each other and to the median plane of the mold, and the reversal of the conduits is carried out by bending them twice practically at right angles. None of these geometrical particularities is necessary and all of them can be amply modified.

It has already been pointed out that a complete separation between an outer compound and an axial one is not possible and that each offtake conduit contains at least parts of a compound which may be considered as intermediate between the outer compound and the axial one. However, in carrying out the process according to the invention it would also be possible to deliberately augment the presence of both types of compound in each offtake conduit and thus impart to the conduits such a configuration, with respect to those from which they derive, that each of them contains parts of a true outer compound and parts of a true axial compound provided that, in the end, the quantities of outer and axial compounds are balanced in the various injection conduits and that preferably the equalization operation leads to a relative uniformity of the temperatures, or more exactly to a marked attenuation of the temperature differences, through the phenomena which will be better understood with reference to FIG. 5.

The effect of the equalization device is diagrammatically shown in FIG. 5. In this Figure, it is assumed that the device will have the configuration shown in FIG. 3, but nothing substantial is changed when the device has a different configuration. The curve composed of the two halves 50-51 indicates the temperature diagram of the compound in the pipe 11, relative to a zero assumed arbitrarily and indicated at 52. Therefore, the hatch indicates the arc of the diagram of the temperatures. When from the primary feed conduit 11 there is branched to the right-hand side, the secondary conduit 12 and to the left-hand side, the symmetrical conduit 12a, only the half 51 of the diagram moves onto the conduit 12, as shown in the figure, while the symmetrical half 50 moves onto the conduit 12a and such movement is not shown, for the sake of simplicity. If we consider the centerline plane P—P which is a horizontal plane when carrying out the molding with a vertical axis mold, the temperature of the part of compound which is situated above the plane and thus will flow through the first offtake conduit for a predominantly outer flow, is indicated by the diagram shown with a simple hatch 54, while the temperature of the predominantly axial compound which will flow through the second offtake conduit is indicated in the cross-hatched diagram 55. The equalization device shown in FIG. 3 brings about the reversal of the two compounds and, consequently, of the respective temperature areas in the combined conduit 15, as indicated in the figure by the areas 55′ and 54′. The temperature diagram is now indicated by the curves 51′ and 51″ which represent respectively the lower and the upper half of the curve 51 shown adjacent to the offtake conduit. Thus, in this conduit, at the centerline plane P—P, which in the embodiment shown in FIGS. 1 and 2 coincides with the plane S—S, but may be different, there are in contact with one another two portions of compound having the minimum and the maximum temperature respectively, i.e., outermost and innermost strata, respectively. Thus, an equalization, a kind of laminar mixing, if it may be said so, of the adjacent compounds occurs, so that the real temperature diagram is not the one defined by lines 51′ and 51″, but a diagram which though not being rectilinear has much less marked variations, as shown by dashed line 56. At this point, the temperature of the compound is sufficiently uniform to allow deriving from the combined conduit 15 the two injection conduits 16 and 16' (FIG. 2), inasmuch as in these conduits there are present compounds having temperatures which are fairly near to one another and hence a molding uniformity.

Should conduits 12, 12a be missing, as in the embodiment of FIG. 4, nothing would change in what has just been said; diagrams 54 and 55 would still represent the trend of the temperatures in each pair of offtake conduits, as conduits 40-41 directly branched from conduit 11 in FIG. 4.

Figure 6:
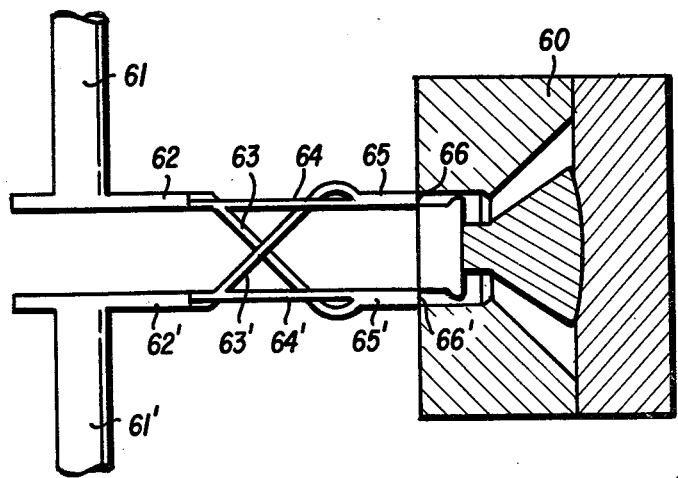
FIG. 6 is a representation, similar to that of FIG. 2 of an apparatus according to another embodiment of the invention.

It has already been pointed out that the cross-sections of the pipes, their particular course, the way in which the equalization is accomplished, and so on, could be modified without departing from the scope of the invention. Some modifications which are immediately obvious are the following:

Instead of a single primary feed conduit there may be provided two, situated along the axis of the mold, either horizontal or vertical, and in opposed relationship to one another. Such situation is shown in FIG. 6, similar to FIG. 2, where reference numeral 60 generally indicates the mold and reference numerals 61 and 61' indicate the two primary feed conduits. Each of these two conduits is divided into a plurality of secondary feed conduits 62-62' and each of these latter is divided into a first offtake conduit 63-63' and a second offtake conduit 64-64'. At this point the equalization may be carried out by joining each conduit 63 to a conduit 64 and each conduit 63' to a conduit 64'. However, alternatively, it is also possible, as shown in the figure, to join each first offtake conduit, for example 63, relative to one sidewall, with the second offtake conduit 64' which is relative to the other sidewall and is situated in the same angular position, and thus join together each conduit 64 and a corresponding conduit 63'. In this way, two combined conduits 65-65' are obtained, which may be made to lead to the one and to the other sidewall, respectively, at the respective injection points 66-66', or the conduits 65-65' may be joined together to form a conduit, and this latter may then be divided into two injection conduits of each sidewall, although such arrangement is not particularly advantageous; or four conduits 63-64-63'-64' may be joined together to form a single combined conduit, from which there may be then obtained two injection conduits for the two sidewalls. These alternative possibilities are not represented, since they are obvious.

Figure 7:
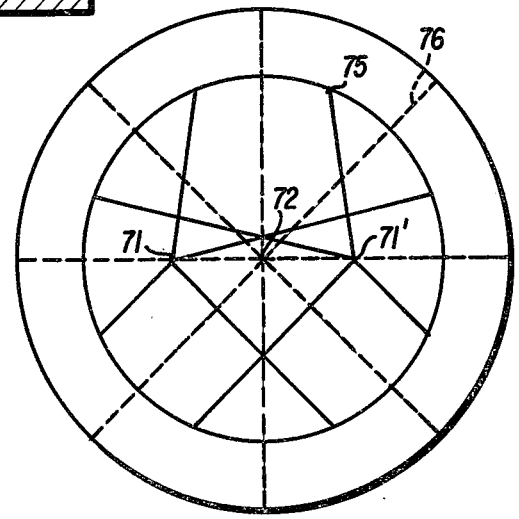
FIGS. 7 and 7A are, respectively, a plan view and a cross-sectional view, similar to those of FIGS. 1 and 2, of a modification of the embodiment shown in FIGS. 1 and 2, completed with means for molding the crown.
Figure 7A:
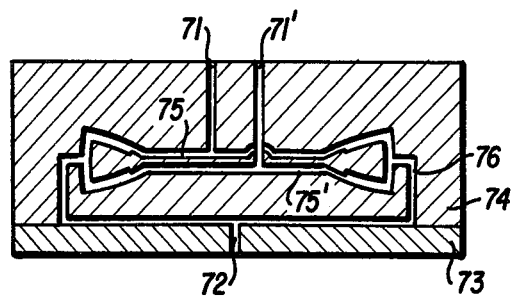

In FIGS. 7 and 7A there is shown an appreciable variation of the embodiment shown in FIGS. 1 and 2, which differs from this latter in that instead of a single primary feed conduit, three of such conduits are provided. FIGS. 7 and 7A are, respectively, a diagrammatic cross-sectional view taken along a plane normal to the axis of the mold and a diagrammatic partial cross-sectional view of a device for molding simultaneously, or almost simultaneously, the sidewalls and the tread. In this case, there are provided two primary feeding conduits 71 and 71' for molding the sidewalls, a primary conduit 72 for the supply of the compound for the tread, secondary injection conduits 75 for the sidewalls and secondary injection conduits 76 for the tread. In this embodiment, the location of the two primary feed conduits 71 and 71' allows also the provision of the primary conduit 72, without having to change parts of the mold or to substitute the latter for carrying out the molding of the tread. Even if the molding of the tread, effected through the mold portions 73 and 74 and the injection conduits 76, would not be carried out simultaneously with the molding of the sidewalls, the possibility of having in place the feed conduits for the tread without being compelled to effect displacements or substitution of conduits, still represents an operational advantage.

Figure 8:
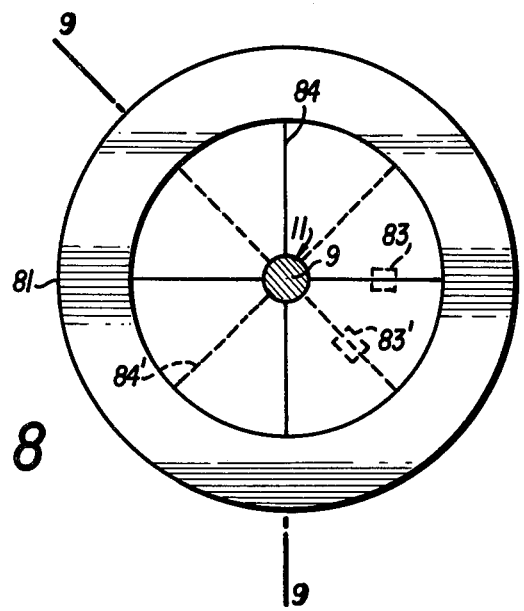
FIG. 8 is a plan view, similar to that of FIG. 1, of an additional embodiment of the invention.
Figure 9:
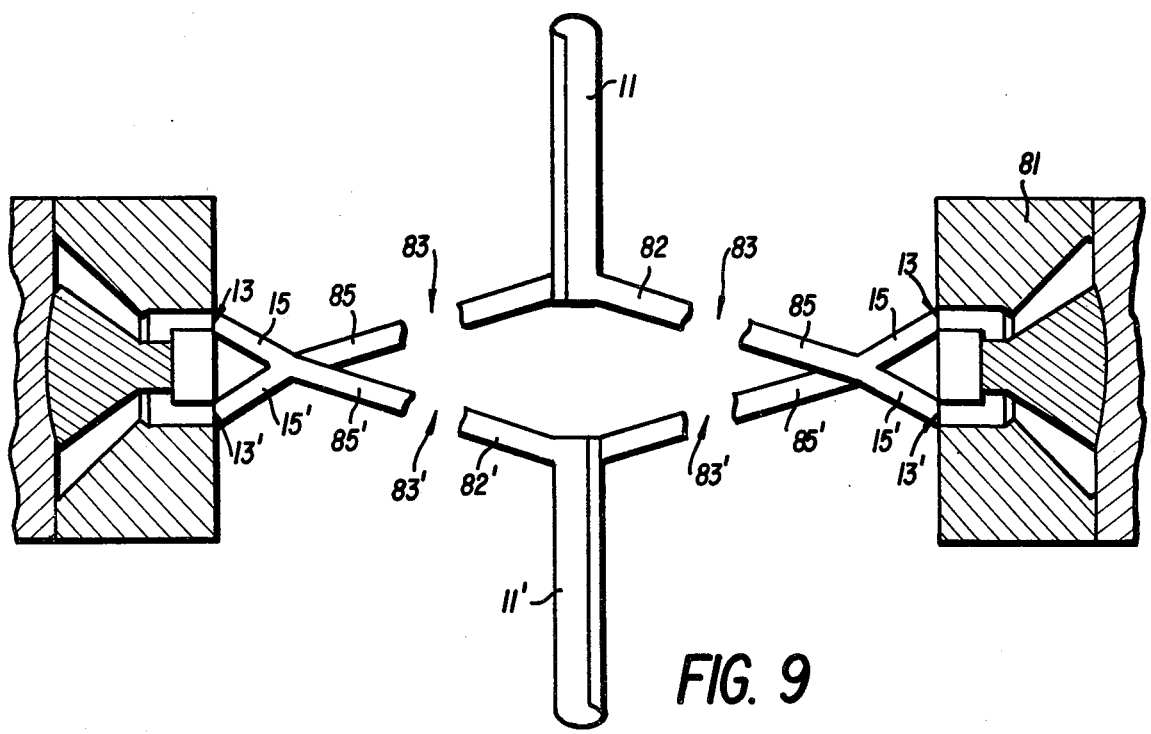
FIG. 9 is a cross-sectional view of the device of FIG. 8 taken along two half-planes disposed at an angle as indicated in FIG. 8.

FIGS. 8 and 9 show in a plan view and in a cross-sectional view along half-planes 9—9—9, respectively, a further embodiment of the invention. In this embodiment, a mold, indicated generally by reference numeral 81, is fed through two opposed primary conduits 11—11'. Branched from each of these latter are a number of offtake conduits for the outer and the axial compounds, with the interposition, in the particular embodiment shown, of secondary feed conduits 82-82' (which may be omitted); and by reversal of the offtake conduits, in equalization device which may be like those described previously, the combined conduits 85-85' and the injection conduits 15-15' for the two halves of the mold are obtained. It is to be noted that the word "halves" is not intended to indicate here, nor in relation to the previous embodiments, and anyhow does not necessarily indicate, separable parts of the molds, but simply portions which are symmetrical relative to the median plane.

Up to this point, this embodiment corresponds to that shown in FIG. 6, in relation to the modification of this latter in which each conduit 63 is joined together with the corresponding conduit 64 and each conduit 63' is joined together with the corresponding conduit 64'. For the sake of simplicity, in FIG. 8 there is indicated by full lines the assembly comprising a secondary feed conduit, an equalization device with respective offtake conduits, one of which is intended for the outer compound and the other for the axial compound, and the resulting combined conduit; and the assembly is indicated generally by reference numeral 84-84', the assemblies 84' relating to the conduit 11' being indicated by dashed lines, for the sake of clarity of the representation. Instead, in FIG. 9, the equalization devices are omitted, these devices being similar to those already shown and being located in the zones 83-83'.

Unlike the embodiment shown in FIG. 6, each of the combined conduits derived from the one or the other of the primary feed conduits 11-11', feeds both mold halves, it being divided into two injection conduits 15-15', in a way analogous to that shown in FIG. 2. Each primary feed conduit 11-11' feeds, through the injection conduits deriving from it, one half of the injection points 13 of one mold half, and half of the injection points 13' of the other mold half. To make this possible, the offtake and the injection conduits deriving from each primary conduit 11-11' are rotated, with respect to those deriving from the other primary conduit, by an angle equal to the angle which separates each injection point from the adjacent one. Thus, if the injection points are, for instance, eight in number, each primary conduit 11-11' originates four secondary conduits (which may be missing), four pairs of one offtake conduit for the outer compound and one offtake conduit for the axial compound, four equalization devices, four combined conduits and four pairs of injection conduits. Thus, there is created for each primary conduit 11-11' a kind of spider-shaped structure, having four arms in the hypothesis under consideration, the two structures being angularly shifted, in the hypothesis under consideration, by 45°. Conduits 82-82', devices 83-83' and conduits 85-85' are not parallel to the median plane of the mold, as in the preceding embodiments, but are conveniently inclined.

The invention has been described in relation to embodiments given by way of illustrative example only, and many variations and modifications may be introduced without departing from the scope of the invention.

In particular, it is clear that the invention may be applied to any tire structure when the same is manufactured, wholly or for the important part of it, by injection molding. Thus, the invention may be applied also to tires which have a conventional structure and which work with sidewalls under tension, for example, conventional radial tires, as well as to tires having the configuration illustrated in the foregoing embodiments or a different configuration, whether they are conventional or not, which are provided with any reinforcement whatever also in the sidewalls. Since the invention is essentially directed to the feeding of the fluid molding compound to the mold, it is obvious that its suitableness and usefulness cannot be excluded by factors internal to the mold, such as particular mold configurations or the presence of inserts of any type, such as reinforcements disposed within the mold for being incorporated into the molded tire.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the injection molding of pneumatic tires, comprising
   in combination with a mold provided with cavities arranged to generate symmetrical parts of the tire having the desired geometrical characteristics,
   at least one primary feed-conduit for a primary feed stream of fluid molding compound;
   a first means, for drawing, from said primary feed-conduit, first intermediate streams predominantly formed from the outer strata of said primary feed stream;
   a second means, for drawing, from said primary feed conduit, second intermediate streams predominantly formed from the axial strata of said primary feed stream;
   a third means, for combining, at least one of each of said first and second intermediate streams, to form a combined stream; and
   a plurality of injection conduits, each one for an injection stream drawn from said combined stream, for filling a mold cavity corresponding to each part of every pair of symmetrical parts of the tire, with fluid molding compound contained in said injection stream.

2. An apparatus according to claim 1 wherein said first means comprises first off-take conduits disposed to receive compound flows of the primary feed stream which are predominantly formed from the outer strata of said feed stream.

3. An apparatus according to claim 1 wherein said second means comprises second off-take conduits disposed to receive compound flows of the primary feed stream which are predominantly formed from the axial strata of said feed stream.

4. An apparatus according to claim 1 wherein said third means comprises combined conduits, each combined conduit being formed by joining together at least one first off-take conduit constituting said first means with at least one second off-take conduit constituting said second means, each combined conduit feeding at least one injection conduit.

5. An apparatus according to claim 4 wherein said first and second off-take conduits are inverted before being joined together to form a combined conduit, so as to bring said intermediate streams at their recombining together such that the strata which were internally situated in the primary feed-conduit are externally adjacent to the strata which were externally situated in said primary feed-conduit.

6. An apparatus according to claim 4 wherein said combined conduits are arranged so as to impart substantially equal delivery capacities to said first and second off-take conduits.

7. An apparatus according to claim 1 wherein from each primary feed-conduit a plurality of secondary feed-conduits are derived, said secondary conduits being distributed symmetrically with respect to the primary conduit from which they are derived and each secondary conduit is divided into at least one first and one second off-take conduit.

8. An apparatus according to claim 1 wherein the primary feed-conduits have circular cross-section, and at least one of the first and second off-take conduits and the injection conduits have a rectangular cross-section.

9. An apparatus according to claim 1 wherein the axis of the mold is vertical, the primary feed conduits extend, at least at their end portion, along said axis, and the secondary feed conduits, the first and the second offtake conduits, and the combined conduits extend in a substantially radial direction with respect to the mold, and symmetrically with respect to the axis of the mold.

10. An apparatus according to claim 1 wherein the first and the second off-take circuits extending radially are diverted in such a way that the second off-take conduits lie in the strata in which the first off-take conduits were previously lying, and vice versa, and said conduits are then joined together, so that from a pair of them a combined conduit is formed which extends in a substantially radial direction, with respect to the mold, and from each of said combined conduits there are derived injection conduits for the cavities of the mold.

11. An apparatus according to claim 1 wherein the primary feed conduit is single and extends, at least in its end portion, along the axis of the mold and on one side of the plane of mirror image symmetry of the cavities which define symmetrical parts of the tire, and wherein each combined conduit is obtained by joining together one first and one second offtake conduit which derive from the same secondary feed conduit.

12. An apparatus according to claim 1 comprising two primary feed conduits extending, at least at their end portion, along the axis of the mold on both sides of the plane of mirror image symmetry of the cavities which define symmetrical parts of the tire, and wherein each combined conduit is obtained by joining together a first and a second offtake conduit which derive, through a secondary feed conduit, from the same primary feed conduit.

13. An apparatus according to claim 1 comprising two primary feed conduits extending, at least in the end portion, along the axis of the mold and on both sides of the plane of mirror image symmetry of the cavities which define the sidewalls of the tire, and wherein each combined conduit is obtained by joining together a first offtake conduit derived, through a secondary conduit, from one of the primary feed conduits, and a second offtake conduit derived, through a secondary feed conduit, from the other primary feed conduit.

14. An apparatus according to claim 1 comprising two primary feed conduits, each of which feeds, through a plurality of offtake conduits, combined conduits and injection conduits, one half of the injection openings of each cavity of the mold.

15. An apparatus according to claim 14, wherein the offtake conduits and the combined conduits extend along axis which are inclined relative to the median plane of the mold.

* * * * *